No. 726,098. PATENTED APR. 21, 1903.
J. B. PITCHFORD.
CONVEYER.
APPLICATION FILED DEC. 2, 1902.
NO MODEL. 2 SHEETS—SHEET 1.

WITNESSES:
INVENTOR
John B. Pitchford
BY
ATTORNEYS.

No. 726,098. PATENTED APR. 21, 1903.
J. B. PITCHFORD.
CONVEYER.
APPLICATION FILED DEC. 2, 1902.
NO MODEL. 2 SHEETS—SHEET 2.

WITNESSES:
Robert Head
C. R. Ferguson

INVENTOR
John B. Pitchford
BY
ATTORNEYS.

UNITED STATES PATENT OFFICE.

JOHN BENJAMIN PITCHFORD, OF RANDFONTEIN, TRANSVAAL, SOUTH AFRICA.

CONVEYER.

SPECIFICATION forming part of Letters Patent No. 726,098, dated April 21, 1903.

Application filed December 2, 1902. Serial No. 133,556. (No model.)

*To all whom it may concern:*

Be it known that I, JOHN BENJAMIN PITCHFORD, a citizen of the United States, and a resident of Randfontein, Transvaal, South Africa, have invented a new and Improved Conveyer, of which the following is a full, clear, and exact description.

This invention relates to improvements in devices for conveying pulp, tailings, riversand, or the like to a place of discharge, the object being to provide, in connection with an endless conveyer or belt moving at a comparatively high rate of speed, a pump for loading the belt at the same velocity as the belt is traveling, thus resulting in equalizing the load and causing a uniform discharge.

I will describe a conveyer embodying my invention and then point out the novel features in the appended claims.

Reference is to be had to the accompanying drawings, forming a part of this specification, in which similar characters of reference indicate corresponding parts in all the figures.

Figure 1:
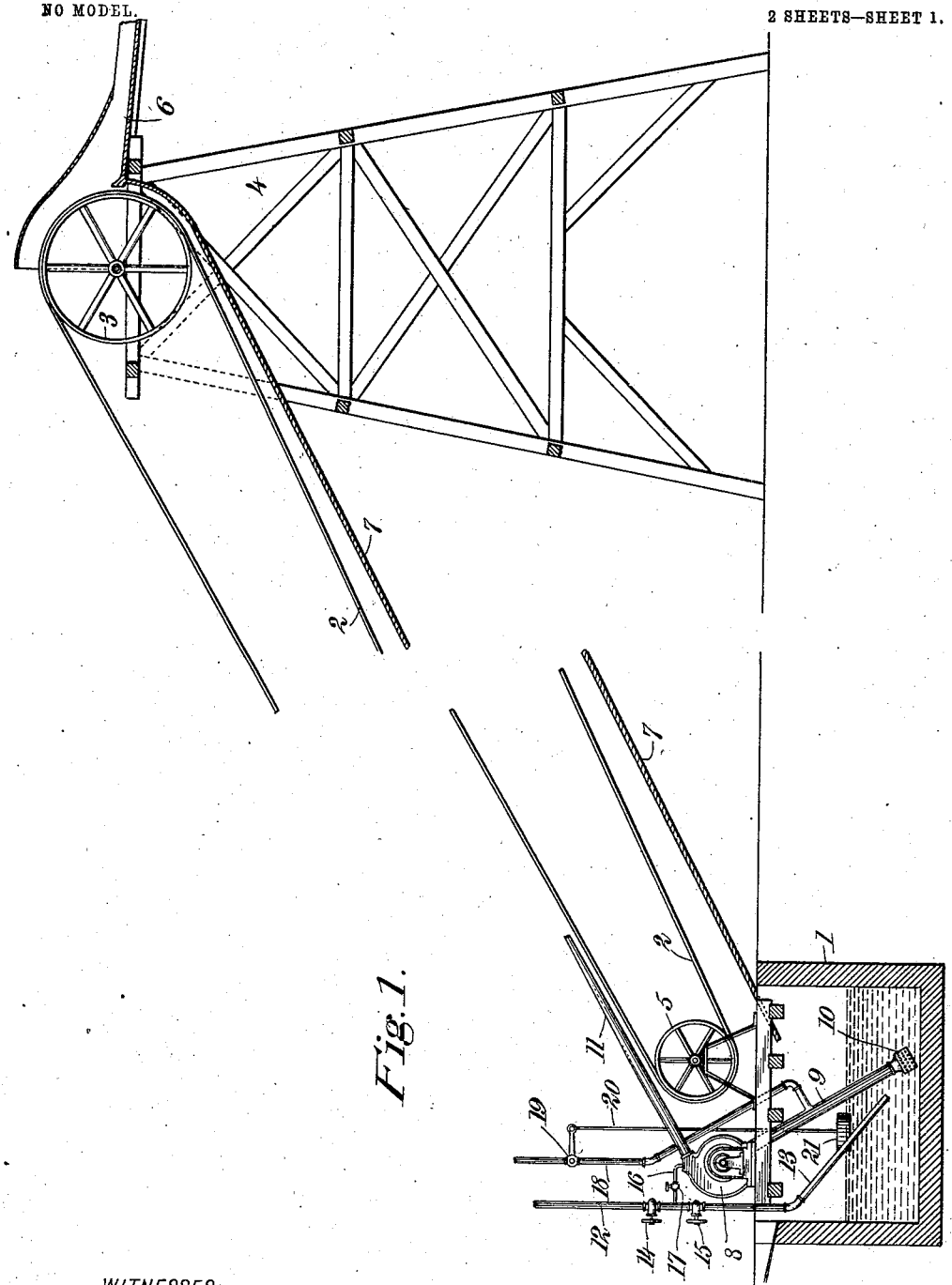
Figure 3:
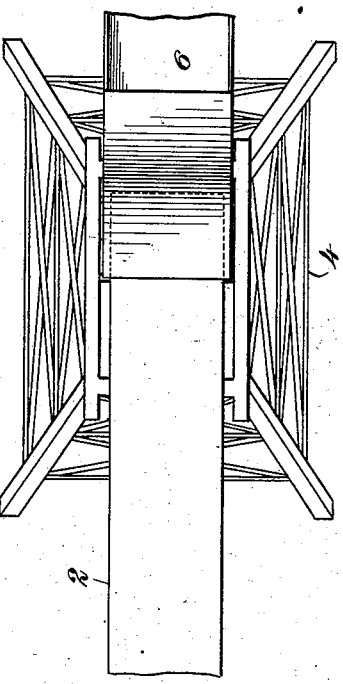
Figure 4:
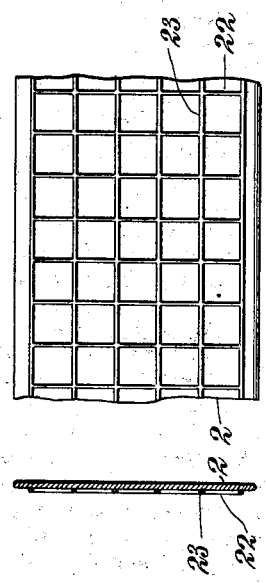
Figure 2:
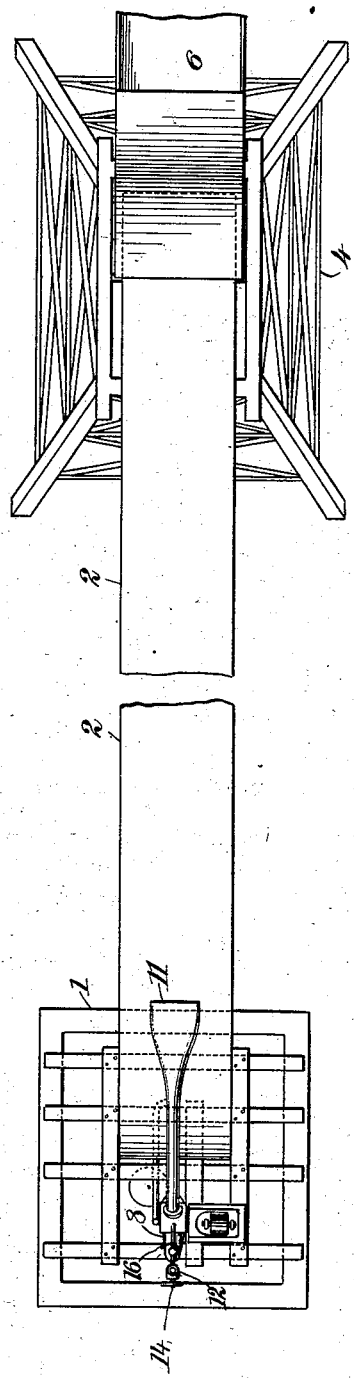

Figure 1 is a broken side elevation of a conveyer embodying my invention. Fig. 2 is a broken plan view thereof. Fig. 3 is a plan view of a conveyer-belt of modified construction, and Fig. 4 is a cross-section thereof.

Referring to the drawings, 1 designates a tank or sump for receiving the material to be conveyed to a place of discharge. From the sump an endless conveyer-belt 2 extends at an upward incline and passes around a pulley 3, supported in a frame 4, the lower end of the conveyer-belt being extended around a pulley 5, arranged over the sump.

The material carried up by the belt is discharged into a chute 6, leading to any desired point. Arranged underneath the lower stretch of the conveyer-belt and having substantially the same incline is a platform 7 for conveying the material that may fall off the belt back to the sump. A suction-pump 8 is arranged adjacent to the lower end of the belt and, as here shown, directly over the sump. From this suction-pump a suction-pipe 9 extends downward into the sump and is provided at its lower end with a strainer 10. Leading from the pump 8 and over the lower portion of the upper stretch of the conveyer-belt is a discharge-nozzle 11. This nozzle is flattened at its outlet end, as plainly indicated in Fig. 2, so as to spread the material evenly upon the belt.

A water-pipe 12 has a portion 13 leading into the sump and terminating near the strainer 10. This is designed to permit an inflow of water to clean away any material that may become hardened or caked around the strainer. This cleaning-pipe is provided with valves 14 and 15, and leading from the pipe from a point between the valves into the pump is a priming-tube 16, which is also provided with a valve 17.

To regulate the suction of the pump, I employ an air-pipe 18, which communicates with the suction-pipe 9, and in this air-pipe is a valve 19, from the stem of which a rod 20 extends downward and connects with a float 21, that rises and lowers with the material in the sump, and consequently causes more or less opening of the valve 19 for the admission of air.

In the operation the conveyer-belt is to be driven at a comparatively high rate of speed, and the pump will be driven at such a speed as to load the material onto the belt at practically the same velocity as the belt is moved. Thus the load will be spread out evenly and equalized along the upper stretch of the conveyer-belt.

To increase the carrying capacity of the belt, I may provide it, as shown in Figs. 3 and 4, with transverse ribs 22 and longitudinal ribs 23, these ribs forming walls of pockets.

Having thus described my invention, I claim as new and desire to secure by Letters Patent—

1. A conveyer comprising an inclined endless belt, a sump at the lower end of said belt, a suction-pump for drawing material from the sump, and a discharge-nozzle leading from said pump to a point over the upper stretch of the conveyer-belt.

2. A conveyer comprising an inclined endless belt, a sump at the lower end thereof, a suction-pump arranged over the sump, a suction-pipe leading into the sump, and a discharge-pipe leading from the pump to a point over the lower portion of the belt, the said pipe having a flattened end and the said pump operating to discharge material onto the belt at substantially the same rate of speed as the travel of the belt.

3. A conveyer comprising an inclined endless belt, a sump at the lower portion of the belt, a suction-pump, a discharge-pipe leading from the pump to a point over the lower portion of the belt, a suction-pipe leading from the pump into the sump, a strainer on the lower end thereof, and a water-pipe leading to a point adjacent to said strainer.

4. A conveyer comprising an endless inclined belt, a sump at the lower portion of said belt, a suction-pump arranged over the sump, a discharge-nozzle leading from said pump to a point over the upper stretch of the belt, a suction-pipe leading from the pump into the sump, an automatically-controlled air-inlet pipe leading into the said suction-pipe, a water-pipe terminating at a point adjacent to the lower end of the suction-pipe, and a priming-tube leading from said water-pipe to the pump.

5. A conveyer for pulp, tailings, sand or the like, comprising an endless belt, and a suction-pump for loading the same, the discharge of material from the suction-pump being at a rate of speed substantially equal to that of the travel of the belt.

In testimony whereof I have signed my name to this specification in the presence of two subscribing witnesses.

JOHN BENJAMIN PITCHFORD.

Witnesses:
L. E. AEILZMAN,
C. I. WIEIR.